United States Patent [19]

Boehringer et al.

[11] 4,441,675
[45] Apr. 10, 1984

[54] HIGH LIFT SURFACE ACTUATION SYSTEM

[75] Inventors: Wilfred E. Boehringer, Fullerton; Teunes Verhoeven, Long Beach, both of Calif.

[73] Assignee: McDonnell Douglas Corporation, Long Beach, Calif.

[21] Appl. No.: 392,356

[22] Filed: Jun. 25, 1982

[51] Int. Cl.³ .................. B64C 3/50; F16H 1/44; G05D 1/00
[52] U.S. Cl. .................. 244/213; 244/194; 74/710.5; 60/711
[58] Field of Search .............. 244/75 R, 76 R, 78, 244/203, 213, 214, 215, 220, 221, 224, 226, 194; 74/710, 710.5, 711, 714; 192/7, 8 R, 9; 318/652; 303/92, 100, 110; 60/711, 716, 719; 440/4

[56] References Cited

U.S. PATENT DOCUMENTS

| | | | |
|---|---|---|---|
| 1,034,242 | 7/1912 | Johnson | 440/4 |
| 2,793,503 | 5/1957 | Geyer | 60/711 |
| 2,827,136 | 3/1958 | Sorchy | 192/7 |
| 3,841,589 | 10/1974 | Appleby et al. | 244/76 R |
| 3,935,754 | 2/1976 | Comollo | 244/213 |
| 4,256,277 | 3/1981 | Embree | 244/213 |
| 4,260,121 | 4/1981 | Baston et al. | 244/213 |

*Primary Examiner*—Trygve M. Blix
*Assistant Examiner*—Rodney Corl
*Attorney, Agent, or Firm*—Paul T. Loef; George W. Finch; Donald L. Royer

[57] ABSTRACT

A drive system for high-lift devices on aircraft having two power drive units, one at each end of the connecting torque tube system, so as to force sum the outputs. A one-way brake always insures against inadvertent retraction of the device but allows extension. An asymmetrical protective device prevents the high-lift device from an asymmetrical condition even after a combined power loss and mechanical failure of the torque tube. The power drive units consist of hydraulic motors driving through a gear box and a no-back brake combination and are controlled by a servo valve.

12 Claims, 6 Drawing Figures

FIG. 5

HIGH LIFT SURFACE ACTUATION SYSTEM

BACKGROUND OF THE INVENTION

The present invention relates to high-lift devices for aircraft wings and, more particularly, to the actuating system for moving either a trailing edge flap system or a leading edge slat system between extend and retract positions.

The aerodynamic design of modern aircraft wings is a compromise between many conflicting requirements, thus limiting their optimum aerodynamic performance to a small portion of their total flight envelope. Obviously, great emphasis must be placed on cruise configuration, as this is the regime most frequently experienced. However, contemporary wings must be configured to include high-lift devices such as flaps and slats, which are, in effect, extensions of the wing. Flaps and slats are used to enhance lift during takeoff and landing and yet may be retracted when the aircraft is in a cruise configuration.

The system which drives the mechanism which supports and provides the kinematics of translation and rotation of the high-lift device itself is governed by the same Federal Aviation regulation as to airworthiness that govern the overall high lift system. Historically, there have been two different approaches to these drive systems in large commercial airplane applications. Systems where the motion is pure rotation about a simple hinge have used hydraulic cylinders properly matched for synchronization of the segmented lift device. However, the cases where the flap requires large translation as well as rotation of the lift device torque tube drive systems have generally been employed which in turn drive various types of linear actuators located at various stations along the torque tube drive. Torque tube drives must be able to transmit full hinge moment from one wing to the other so as to avoid asymmetrical positioning of the lift device. Under the airworthiness regulations, the airplane must demonstrate safe flight with the high-lift devices asymmetrically positioned or else demonstrate by calculation that the conditions which allow asymmetry are improbable beyond a predetermined probability factor. The nature of the high-lift device is such that in the asymmetrical condition the wing with the lift device retracted stalls before the wing with the device extended. When one wing stalls, of course, it causes the airplane to roll.

All existing flap or slat torque tube drive systems used in large commercial airplanes to date locate the drive unit in the middle of the drive system and transfer power out each wing. All these aircraft must employ some device to prevent asymmetrical or uncommanded positioning of the lift device in the event of a failure of the torque tube. The protection generally consists of no-back devices at each drive station in combination with a computerized electrical asymmetry monitor for shutdown, or alternately, asymmetry brakes in combination with a computerized asymmetry and runaway protection system. The no-back device is required to prevent the air loads acting on the high lift device from driving the surface in the opposite direction. The asymmetry brakes lock the entire system when the asymmetry condition is detected by a sensing system. All these devices are susceptible to latent failures in that one of these devices can fail and will not be detectable until the second failure occurs. This necessitates periodic physical inspections of the device to examine for failures to achieve the required reliability levels.

Super critical wing geometry dictates thin shell flap structure as well as flaps which require large translation as well as rotation of the flaps. Large translations dictate the requirement for a flap driving mechanism which provides equal motion to prevent skewing, i.e. the flap drive at each hinge must be synchronized to extend and retract together.

It is an object of this invention to provide a new high-lift device drive system architecture which:

(a) has the ability to operate the high-lift device with one power source inoperative and without impacting the crew workload or operating procedures;

(b) requires two independent and separate mechanical failures before the device can go asymmetrical and one of the failures must be a broken torque tube;

(c) does not require flight crew action to detect asymmetry, and (d) passive failure of any device is detectable from outside the wing.

SUMMARY OF THE PRESENT INVENTION

In summary, the high-lift surface actuation system of this invention accomplishes the above objects and overcomes the disadvantages of the prior devices by providing a drive system for a multi-segment, high-lift device which spans either the trailing or leading edge of an interrupted airfoil like a wing. Two power drive units are employed in a force summing arrangement, with one drive unit at each outboard end of the system. The two power units are connected by torque tubes with drive stations interposed between the two drive units as required to drive actuators which in turn drive the various segments of the high-lift device. Position synchronization between the two sides of the interrupted airfoil are fed back to an asymmetrical shutoff valve which automatically shuts off the drive in the event that an asymmetrical conditions occurs between the two sides of the interrupted airfoil. The system is also provided with a one-way brake which brakes only in the direction to retract the high-lift device. In normal operation the brake is released to drive the high-lift device into the retract position. This allows the high-lift devices to always be extended without brake release, but the system cannot be retracted without brake release.

An alternative embodiment is disclosed wherein the power drive units are driven by two independent motors with brakes through a differential gear box so that both the speed and torque output of the two motors is force and speed summed or combined in a single input to the power drive unit. In the event of failure of one of the motors, the differential will allow the unit to be driven by one half torque at one half speed provided the brake associated with the out motor is engaged. As with any differential, e.g. an automobile, both sides must see a load. Since there is redundancy at the drive, there is no requirement in this embodiment to sense an asymmetrical condition between the two opposing lift devices which in turn shuts off the drive.

BRIEF DESCRIPTION OF THE DRAWINGS

With reference to the drawings, wherein like reference numerals designate like portions of the invention:

FIG. 5 is a schematic of an alternate embodiment showing dual motor drives through a differential gear box to the power drive unit.

DESCRIPTION OF THE PREFERRED EMBODIMENT

Figure 1:
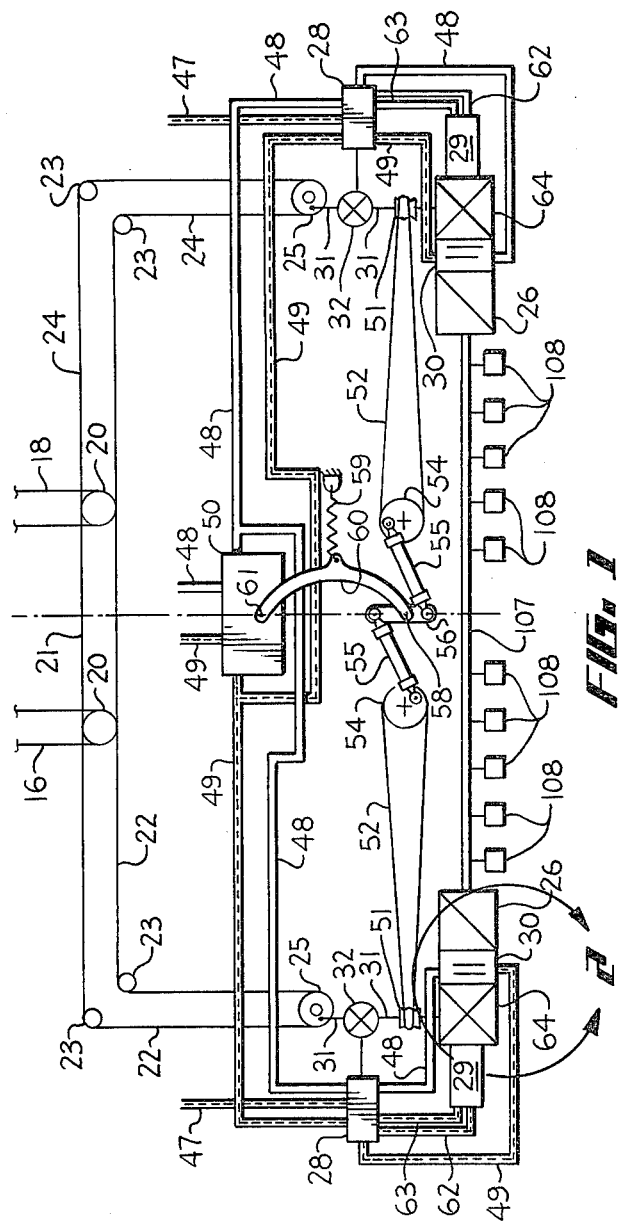
FIG. 1 is a schematic representation of the high-lift device drive system.
Figure 3:
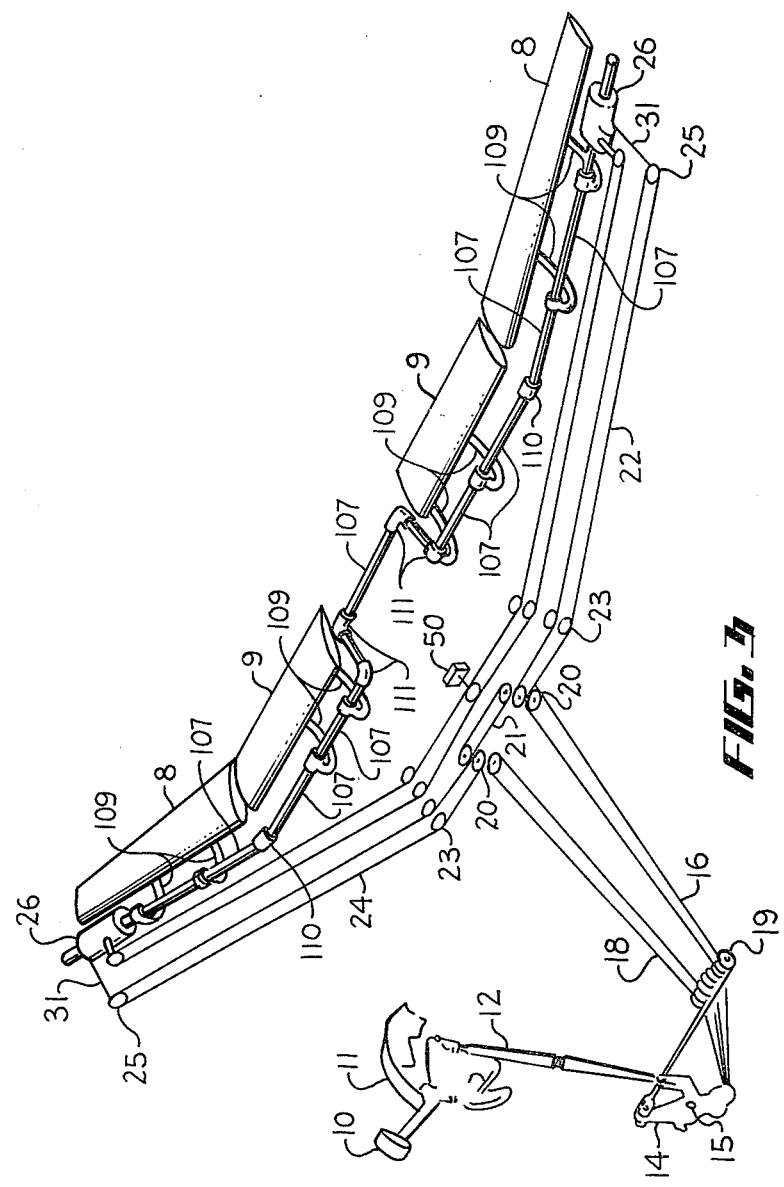
FIG. 3 is a perspective view of a trailing edge high-lift device arranged as it would be in a wing configuration showing the actuation system.

The overall system is best understood by combining the schematic of FIG. 1 with the perspective schematic of FIG. 3 which shows a trailing edge or flap drive system.

Actuation of the flap system is initiated by the pilot moving the flap handle 10 which is attached to the quadrant 11 and moves the link 12 which rotates the rocker link 14 about the point 15. Movement of the rocker link 14 moves the cables 16 and 18 which are anchored at either end of the rocker arm 15, bend around the pulleys 19 and are anchored at the drums 20. Bus cable 21 is also shown or anchored to the drum 20 to insure rotation of both drums in the event one of the cables 16 or 18 fails. Cable sets 22 and 24 also are anchored at one end to the drum 20 and at the opposite end to the drum 25, turning about the second pulley 23 as required.

Figure 2:
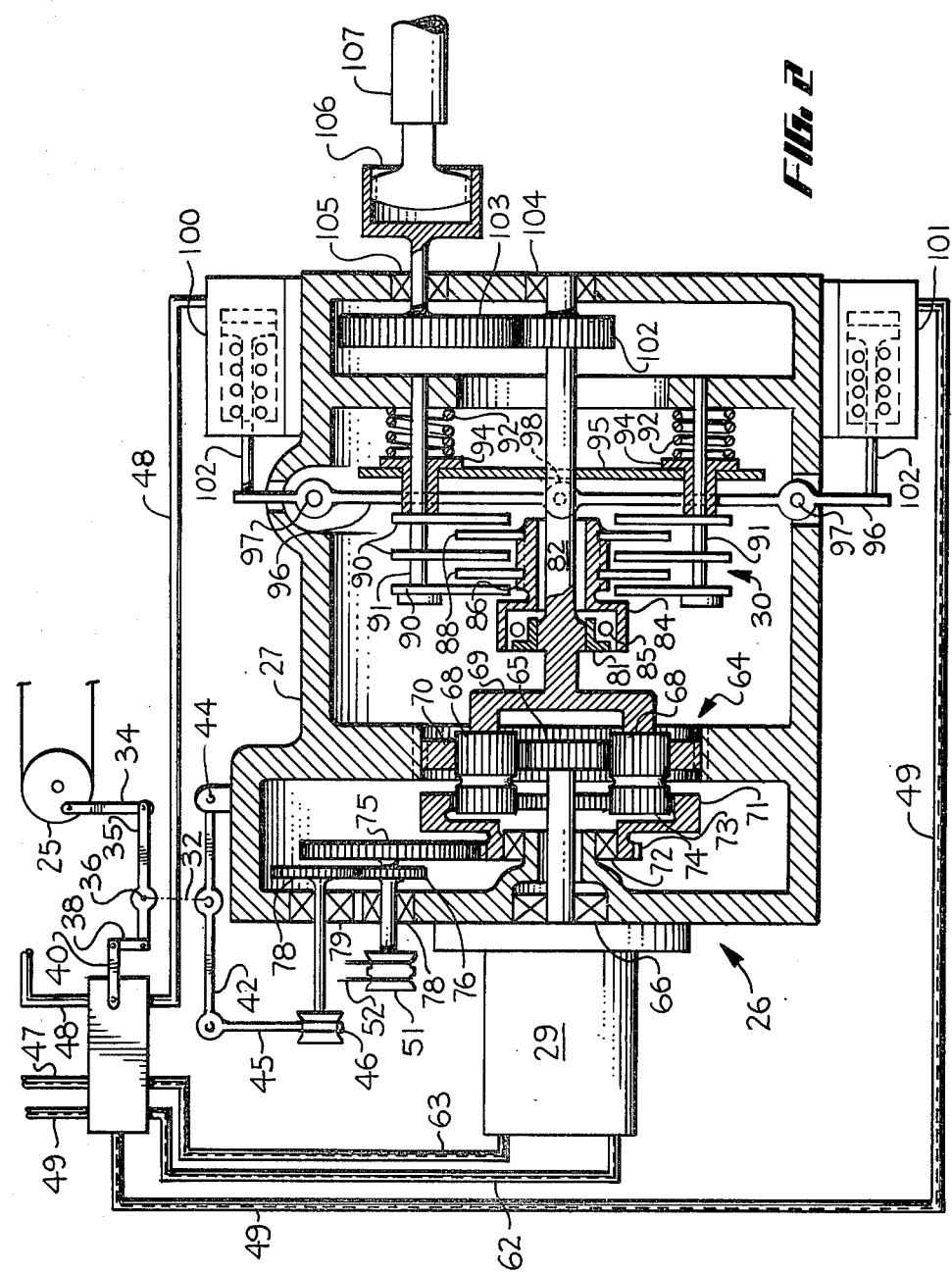
FIG. 2 is a schematic representation, although functional in nature, of the power drive unit with the immediately attaching parts shown schematically.

The second drum 25 is shown connected to the servo control valve 28 and the power drive unit 26, which includes the motor 29, the gear box 64 and the brake 30, by the line 31 in the schematic presentation of FIG. 1. Line 31 includes the summing function shown as 32 in the schematic of FIG. 1 which combines the servo command and follow-up signals. The summing functions of 32 is better shown in FIG. 2 which shows the power drive unit. The second drum 25 drives the link 34 which in turn drives the command pivot link 35 pivoted at 36. Command pivot link 35 is in turn connected to the spool arm 40 by the link 38. Movement of the spool arm 40 displaces the spool (not shown) of the servo valve 28 admitting hydraulic fluid to the hydraulic motor 29 which in turn drives the power drive unit 26. The dotted line at 32 indicates a mechanical linkup between the command pivot link 35 and the follow-up link 42 so that as the follow-up link 42 moves, it combines with the command link 35 to function as a feedback in a typical servo loop, thereby adjusting the spool position in the servo contol valve 28. The follow-up link 42 is hinged at 44 and driven by an idler link 45, connected to a short arm 46 (not shown) attached to the output of the follow-up gear. The function will be further discussed infra along with the gearing in the power drive unit.

A first hydraulic system 48 and a second hydraulic system 49, distinguished by the dash within the tube schematically representing the system, are shown connected to an asymmetry shut-off valve 50. The asymmetry shut-off valve 50 closes when the opposing sides of the high-lift device become non-symmetrical, e.g. the flap on one wing gets out of synchronization with the flap on the other wing. The position of the high-lift device is determined on either side by a gear output from the power drive unit 26 which terminates in a pulley 51. Wrapped around the pulley 51 is a cable 52 which terminates by anchoring at the third drum 54. Rotation of the position gear 76 rotates the pulley 51 which in turn rotates the third drum 54. Also shown connected to the third drum 54 is a push rod 55 which in turn connects to the balance arm 56. Since the position systems on opposing sides are symmetrical, if both sides drive equally both pushrods 55 extend or retract in the same direction so that the balance arm simply rotates about the pivot point 58. If the third drums 54 do not rotate in the same direction or in different amounts, pushrods 55 will pull one direction or the other depending on the error, either extending or retracting the spring 59. Differential rotation of the two drums 54 causes lateral displacement of the balance arm 56 which is pinned at 58. Displacement of the rocker arm 60 in either direction actuates the asymmetrical valve 50 by producing rotation at 61. Should cable 52 fail (separated) spring 59 will activate rocker arm 60 to also actuate asymmetrical valve 50. This is a schematic representation and there are many alternative devices for this purpose known to those skilled in the art.

As long as the opposing high-lift devices remain symmetrical, the asymmetry valve 50 will remain open and the first hydraulic system 48 supplies the first or right side as shown in FIG. 1 terminating in the servo control valve 28. Pressure is then outputted from the valve 28 in line 62 or 63 while the alternate line functions as a return line, depending on the direction of rotation of the hydraulic motor 29 to either extend or retract the high-lift device. Return line 47 is shown simply to complete the hydraulic circuit.

Shown connected to the output of the hydraulic motor is a sun gear 65 supported in a bearing at 66. The sun gear engages a set of planet gears 68 which in turn are connected to the spider 69. The planet gears and spider 69 rotate about the fixed ring gear 70 to accomplish an overall reduction of the motor output which follows the formula $1 + N_3/N_1$ where $N_3$ is the pitch diameter of the sun gear 66 and $N_1$ is the pitch diameter of the planets 68. A further reduction is accomplished by driving a second ring gear 71 via planet spider 69 and the second planet set 73. The ring gear is supported by bearing 72 and has an external spur gear at 74. The spur 74 drives the driven spur 75 which has another spur gear 76 attached to the shaft and is supported by another bearing 78. Pulley 51, attached on the outboard side of gear 76, drives the third drum 54 to control the asymmetry valve 50. The spur gear 76 in turn drives the final output spur 78 attached to the shaft that is supported by the bearing 79. The short arm 46 attached to the outboard side which in turn drives the idler 45 and the follow-up link 42 which is mechanically connected with the command link 35 so as to sum the two motions to complete the feedback loop.

Attached to the output side of the planet spider 69 is a no-back device 80. Typically this indexing type no-back device permits rotation in one direction and does not permit rotation in the reverse direction. As an example, two such no-back devices suitable for use in the preferred embodiment of the present invention is disclosed as Model #8601 Rotostat, Adams Rite Manufacturing Co., Glendale, CA or Model FSR Series manufactured by Formsprag, 23601 Hoover Rd., Warren, MI and their catalog data is incorporated herein by reference. No-back 80 consists of a rotating member 81 which is attached to the output shaft 82 and a fixed member 84 which is free of the output shaft 82. A series of balls 85 are located between the races and the races are ramped to allow rotation in one direction and not in the other if the fixed member is attached to fixed structure. In this case the fixed member 84 is provided with a spline at 86 which slideably fixes a pair of rotating disks 88. Arranged to slideably engage the rotating disks 88 are the fixed or stator disks 90 slideably supported on a pair of pins 91 which are in turn supported in the fixed structure of the housing 27. Biasing the stator disks 90 into engagement with the rotating disk 88 are a pair of springs 92 which bear against a pair of bushings 94 which are contained in the backup plate 95. This assembly constitutes the brake assembly 30 which is normally engaged as a result of the biasing springs 92 securing the fixed member 84 of the no-back device 80. Means are provided to release the brakes by the levers 96 which are pivoted at 97 and have a bearing surface at 98 which engages the backup plate 95. The two levers 96 are actuated by a first brake cylinder 100 and a second brake cylinder 101 to actuate the opposing levers 96. Either brake cylinder will disengage the brake by extending the piston 102 which acts against the end of the lever 96 which is pinned at 97 forcing the bearing surface 98 to engage the back-up plate 95, compressing the biasing springs 92, thereby disengaging the brake 30. The first hydraulic system 48 supplies the pressure to the first brake cylinder 100 while the second hydraulic system 49 supplies pressure to the second brake cylinder 101 so that you have the redundancy of either hydraulic system being able to release the brake assembly in the event that one hydraulic system is out.

Now it should be reasonably clear that when the spider output shaft 82 is rotated in one direction, it is always free to rotate regardless of whether the brake assembly 30 is engaged or not since the no-back always permits rotation in one direction. However, rotation in the opposite direction can only occur in the event that the brake 30 is released so that the fixed member 84 of the no-back device 80 is free to rotate. Whenever the brake assembly 30 is engaged, the fixed member of the no-back is fixed and rotation in that direction is prevented. The direction of free rotation corresponds with the extension of the high-lift device so that the high-lift device may always be extended without brake release, but cannot be retracted without brake release.

Attached to the output shaft 82 is a final drive spur gear 102 which in turn drives the final driven spur gear 103 both of which are supported in bearings shown as 104 and 105. Connected to the output of the final driven spur gear 103 is a coupling 106 which connects to the torque tube 107.

The two power drive units 26, located at the outboard ends of each wing, are connected together by a series of torque tubes 107 which force sum the combined torque outputs of the two power drive units 26. The rotary actuators 108 are right-angle reduction gear boxes whose output may be connected to a flap actuation means 109. Alternatively, these means include direct connection to the high-lift device where simple rotation is required, to a jackscrew for linear motion, or directly to a linkage system or a combined linkage and track system. The input to the rotary actuators 108 is a pickoff gear (not shown) located on the torque tube. Typically torque limiters are installed at each drive station between the rotary actuator and the torque tube to prevent full power dive unit output torque from driving into a single hinge. Universal type couplings 110 may be used where the string of torque tubes 107 deviate from the straight line. Right angle bevel gear boxes 111 are shown where right angle turns are required such as through the wing box where the two wings are connected.

In normal operation the high-lift device position is selected by the pilot moving the cockpit handle 10 which drives the cable loop 16 and 18. The cables transmit motion to the servo control valves 28 which open supplying hydraulic pressure to the hydraulic motors 29. The hydraulic motors drive the power drive units 26 which produce a gear reduction as well as feedback signal to the servo control valve. Power drive unit 26 also produces an output which is representative of the position of the high-lift device which is compared to a similar position output from the other power drive unit, which is compared through the asymmetry shutoff valve 50. This valve shuts off the hydraulic power in the event the positions do not match. The output of the power drive unit 26 drives a series of torque tubes 107 which interconnect the two power drive units so as to force sum their combined output. The actuators are located at various stations along the torque tube which in turn drive the high-lift devices. If either power drive unit 26 is lost, the remaining power drive unit will position all the high-lift devices.

It should now be reasonably apparent that two independent and separate mechanical failures must occur before an asymmetrical or uncommanded high-lift device position may occur and one of these failures must be a broken torque tube. Further, the system may be readily checked on the ground by powering one system and putting a retract input signal into the associated control valve only, this checks one brake plus all associated mechanical segments. The second brake is then checked by powering the second system only and repeating the procedure with the alternate control valve.

Figure 4:
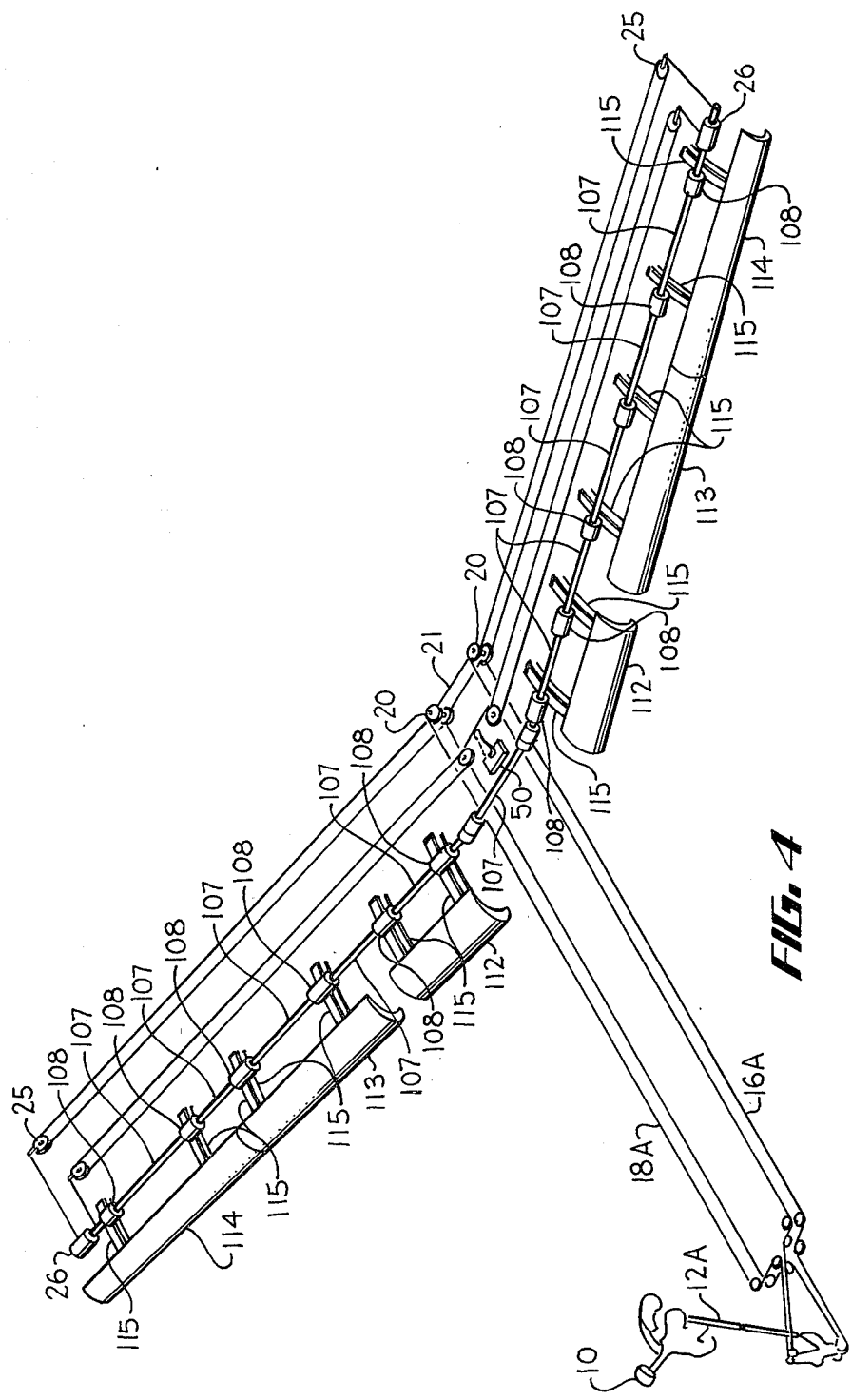
FIG. 4 is a perspective view of a leading edge high-lift device showing the actuation system.

A leading edge high-lift device, generally called slats, is shown in perspective in FIG. 4. Similar items although slightly different than the flap system of FIG. 3 are identified with the same arabic number followed by an 'A'. The inboard slats are identified as 112, the intermediate as 113 and the outboard as 114. Slat actuation means 115 are shown schematically as tracks, although any of the alternative schemes discussed above are possible.

Figure 5:
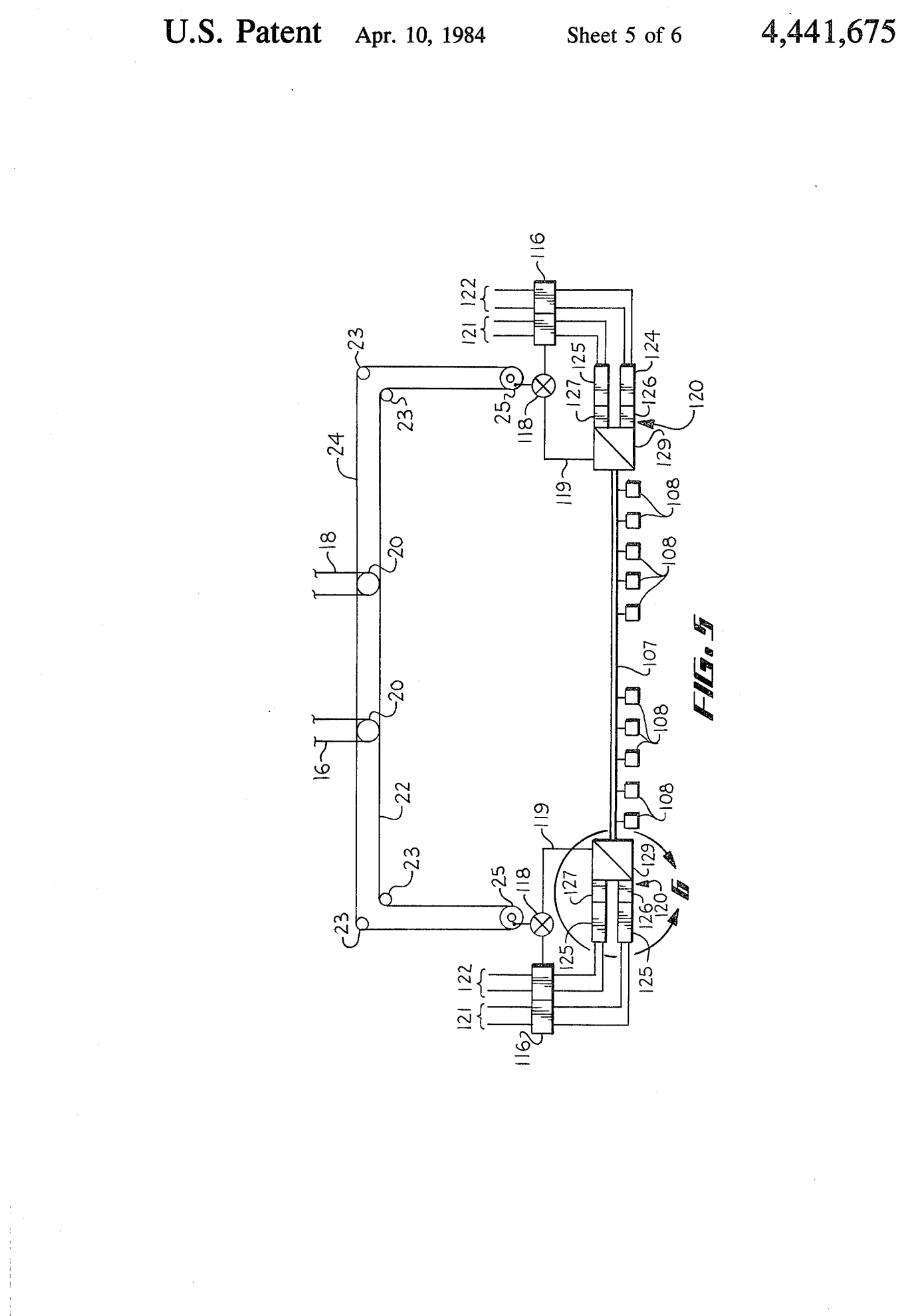
Figure 6:
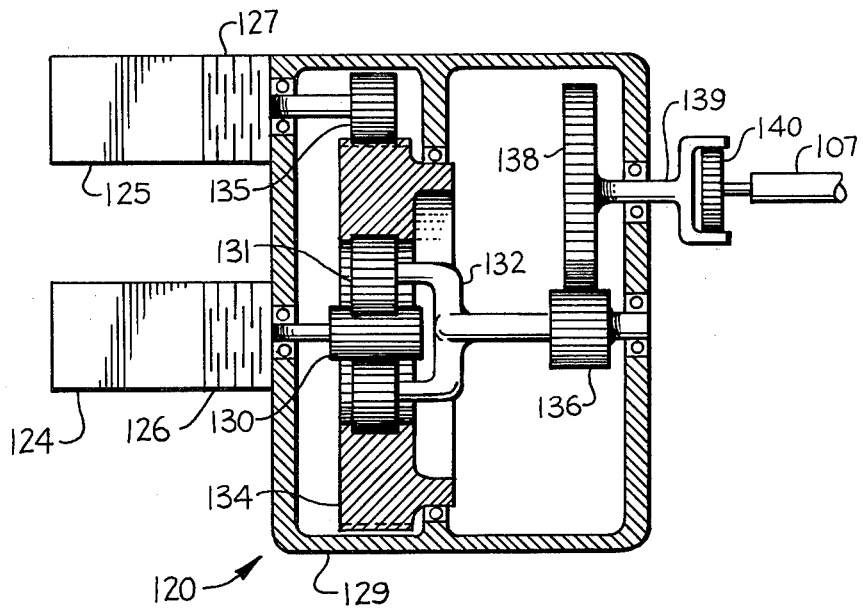
FIG. 6 is a schematic representation, although functional in nature, of the power drive unit using the differential gear box of the alternate embodiment of FIG. 5.

An alternative embodiment of the invention is shown in FIGS. 5 and 6 where the asymmetry protective device has been replaced by additional redundancy in the system. Movement of the high-lift device is again initiated by the pilot moving the flap handle 10. Second drum 25 drives a pair of tandem hydraulic servo control valves 116 through the summing junction 118 which also accepts a feedback signal shown by the line 119 which feeds back a follow-up position signal to combine with the input signal so as to properly control the servo valves 116. The follow-up signal could be generated mechanically, as indicated in the preferred embodiment, by a suitable gear reduction in the redundant power drive 120. Alternatively, the position signal can be generated directly from the lift device through the application of a position transducer which feeds an electrical signal to the same summing junction 118, all of which is well known in the art. The first hydraulic system 121 and the second hydraulic system 122 are shown in the single line diagram indicating pressure and return lines to each of the tandem servo control valves 116. When the valves are open hydraulic pressure from the first system is supplied to a first hydraulic motor 124 and the second system supplies a second hydraulic motor 125. System pressures is also plumbed (not shown) to a first brake 126 and a second brake 127 which, unless released, lock the system in a fixed position. Two independent motors drive, through the brakes, to a single differential type gear box 129. While any epicyclic gear train of the differential motion type would be suitable in this application it is described in FIG. 6 as one employing planet type gears. Attached to the output of the first hydraulic motor 124 is a sun gear 130 which in turn engages a set of planet gears 131 that are supported by the spider 132. The outside of the planet set 131 engages the internal teeth on the ring gear 134 while the outside teeth on the ring gear 134 are driven by the pinion gear 135 attached to the output of the second hydraulic motor 125. This combination forms a typical planet differential gearing system. In this differential arrangement, the output speed of the spider 132 is halved in the event that either drive motor is lost so that the system is driven by either gear 130 or 135 alone. Drive gear 136 is attached to the output side of the spider 132 and combines with the driven gear 138 to produce further gear reduction. Output shaft 139 terminates in a coupling 140 which connects to the torque tube 107. This gear box 129 is also shown somewhat schematically, as bearings are shown to indicate rotating means rather than good design practice. Again, adequate support of the rotating members and, for that matter, best arrangements are well-known to those skilled in the art. Further redundancy is beneficial in that each hydraulic motor 124 and 125 should be serviced by different hydraulic power supplies 121 and 122 so that in the event of a single power supply loss one brake in each end of the system can be released.

In this embodiment, the asymmetry protection is dispensed with in light of the enhanced redundancy in the power system. Again, as in the preferred embodiment, a double failure is required in order for the two halves of the high lift device system to become unsymmetrical. One of these failures must be a broken torque tube 107. The redundancy allows the high lift device to function with combinations of multiple hydraulic and mechanical failures. This system may also be readily checked on the ground by the procedure for the preferred embodiment.

It may thus be seen that either of the two power drive unit designs, with the drive units located at the outboard ends of the system, serve to solve the indicated problems encountered in the prior art. The safety requirements may be met without the need for electrical monitoring devices, or electrical computers to prevent asymmetrical positioning of the opposing sides of the high-lift device systems. This system is also checkable for failures on the ground and two independent and highly improbable mechanical failures must occur before the flap asymmetry protection is lost.

What is claimed is:

1. A drive system for a high-lift device on an aircraft consisting of at least two independent segments comprising:
    a torque tube;
    a first power drive unit connected to the first end of said torque tube;
    a second power drive unit located remote from said first power drive unit and connected to the second end of said torque tube so as to form an open loop drive driven from both ends and connected so that the force output of said first and second power drive units sum;
    means connected between said torque tube and said high-lift device segments for extending and retracting said high-lift device segments as a result of rotation of said torque tube;
    at least one power source connected to each of said first and second power drive units;
    means to control said power source;
    means to measure asymmetry between said at least two independent segments and produce a responsive asymmetrical signal;
    means to lock said segments in their current position in the event asymmetry exceeds a pre-determined amount; and
    means to lock said segments in their current position in the event there is an interruption of said asymmetrical signal.

2. The drive system for an aircraft segmented high-lift device of claim 1 wherein said means to lock said segments in their current position in the event asymmetry exceeds a pre-determined amount and said means to lock said segments in their current position in the event there is an interruption of said asymmetrical signal, comprises a brake in said drive system normally biased to brake and released with application of power from said at least one power source.

3. The drive system for an aircraft segmented high-lift device of claim 2 wherein said means to lock said segments in their current position in the event asymmetry exceeds a pre-determined amount and said means to lock said segments in their current position in the event there is an interruption of said asymmetrical signal further includes a mechanical summing means having at least two mechanical inputs produced by said means to produce a responsive asymmetrical signal so that an output is produced from said mechanical summing means only if said at least two mechanical inputs are unequal by a predetermined amount representing an asymmetry, actuating said brake and said mechanical summing means is bias mounted so that said mechanical summing means is displaced if the integrity of one of said at least two mechanical inputs is severed, said displacement actuating said brake, whereby either an asymmetrical mechanical input or a mechanical failure of one of said mechanical inputs locks said at least two independent segments.

4. The drive system for an aircraft segmented high-lift device of claim 1 wherein said first and second power drive units include said means to lock said segments in their current position in the event asymmetry exceeds a pre-determined amount and means to lock said segments in their current position in the event there is an interruption of said asymmetrical signal so as to further comprise:
    a motor;
    a gear reduction unit, having a gear train contained in a fixed structure and driven by said motor;
    a no-back device, having a rotating member and a fixed member with said rotating member attached to said gear reduction unit output shaft;
    a brake attached between said fixed structure and said fixed member of said no-back device with said brake biased to engage and having means to disengage upon application of power to said motor whereby said power drive unit can drive in only one direction with said brake engaged and in both directions with said brake disengaged.

5. The drive system for an aircraft segmented high-lift device of claim 4 wherein said at least one power source is two hydraulic power sources, said motors are hydraulic motors and said means to disengage said brakes is a pair of hydraulic cylinders for each of said brakes supplied by alternate hydraulic power sources.

6. The drive system for an aircraft segmented high-lift device of claim 4 wherein said means to measure symmetry between said at least two independent segments and produce a responsive asymmetrical signal is differential gear position of first and second position gears driven by said gear reduction unit of said first and second power drive units and driving a balanced linkage which operates a shut-off valve to shut off said power source so as to lock said hydraulic motors and engage said brakes.

7. The drive system for an aircraft segmented high-lift device of claim 4 wherein said means to control said power source is first and second servo valves controlling said first and second power drive units.

8. The drive system for an aircraft segmented high-lift device of claim 4 wherein said means to measure asymmetry between said at least two independent segments and produce a responsive asymmetrical signal is differential gear position of first and second position gears driven by said gear reduction unit of said first and second power drive units and driving a means to shut off said power source.

9. A drive system for a high-lift device on an aircraft consisting of at least two independent segments comprising:
 first and second motors having first and second brakes releasable with the application of power;
 a first differential gear box which sums both the force and speed of two inputs connected to the output of said first and second motors having first and second brakes to form a first drive unit;
 third and fourth motors having third and fourth brakes releasable with the application of power;
 a second differential gear box which sums both force and speed of two inputs located remote from said first differential gearbox and connected to the output of said third and fourth motors having third and fourth brakes to form a second drive unit;
 a torque tube connected between the outputs of said first and second drive units so as to form an open loop drive, driven from each end;
 means connected between said torque tube and said high-lift device segments for extending and retracting said high-lift device segments as a result of rotation of said torque tube;
 at least one power source connected to said first and second drive units; and
 means to control said power source.

10. The drive system for a high-lift device on an aircraft of claim 9 wherein said at least one power source is a first hydraulic power source connected to said first and third motors and a second hydraulic power source connected to said second and fourth motors.

11. A drive system for a segmented control surface on an aircraft consisting of at least two independent segments comprising:
 a torque tube;
 first and second power drive units, located remote from each other and connected one at each end of said torque tube so as to form an open loop drive driven from both ends and said first and second power drive units further comprise:
 a motor having an output shaft and supported on fixed structure;
 a no-back device, having a rotating member and a fixed member with said rotating member attached to said motor output shaft;
 a brake attached between said fixed structure and said fixed member of said no-back device with said brake biased to engage and having means to disengage upon application of power to said motor whereby said power drive unit can drive in only one direction with said brake engaged and in both directions with said brake disengaged;
 means connected between said torque tube and said control surface segments for extending and retracting said control surface segments as a result of rotation of said torque tube;
 at least one power source connected to said first and second power drive units;
 means to control said power source; and
 means to measure asymmetry between said at least two independent segments and produce a responsive asymmetrical signal applied to said means to control said power source so as to apply said brake and stop said motors.

12. The drive system for an aircraft segmented control surface of claim 11 further comprising:
 means to lock said control surface segments in their current position in the event there is an interruption of said asymmetrical signal.

* * * * *